Feb. 20, 1968    P. M. PAPPAS    3,369,481
BROILER
Filed June 22, 1965
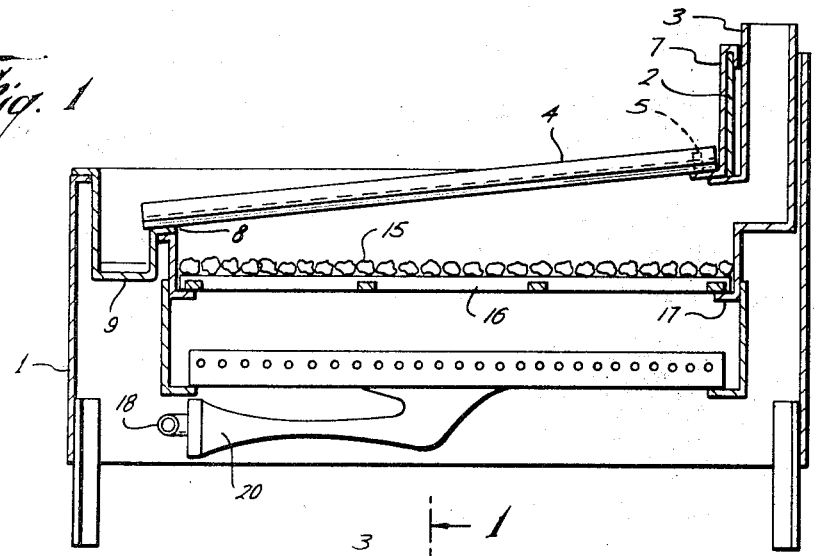
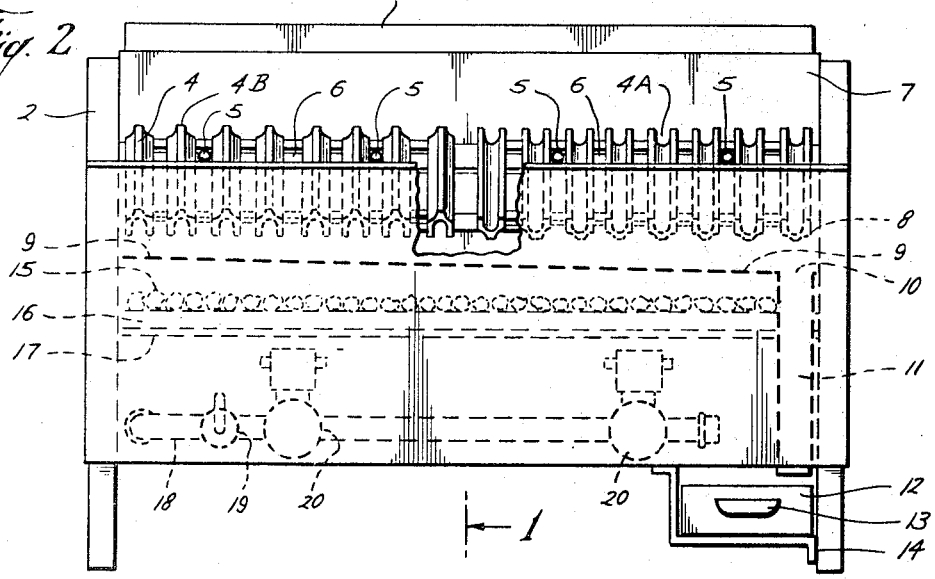
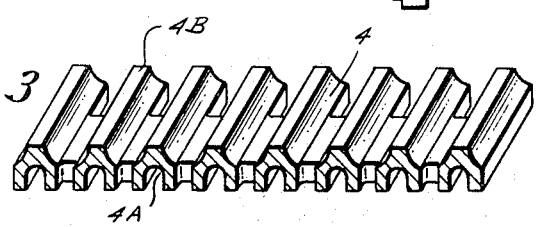
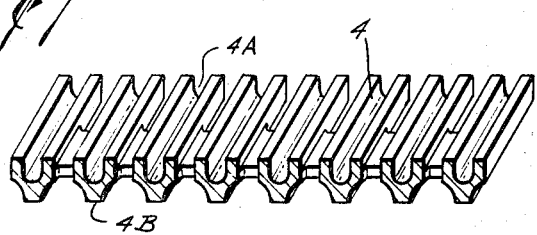
Phillip M. Pappas
INVENTOR.

United States Patent Office 3,369,481
Patented Feb. 20, 1968

3,369,481
BROILER
Phillip Miller Pappas, 2318 Bluebonnet Blvd.,
Houston, Tex. 77025
Filed June 22, 1965, Ser. No. 466,036
7 Claims. (Cl. 99—445)

ABSTRACT OF THE DISCLOSURE

A food broiler having removable, reversible grid sections inclined above a firebox with heated refractory coals with grid sections in one position having multiple U shaped parallel channels with alternate openings between with the channels receiving about two-thirds of the liquefied fats from broiling foods and inclining this fat to a well. The remainder of the fat drops on the heated refractory coals through the alternate openings. With the grid sections reversed the U channels are inverted downward exposing a flat supporting rib on the top portion of each inverted U channel with the alternate openings between directing all of the liquefied fat on the heated refractory coals. A rear exhaust flue passage the full width of the fire box is provided to prevent over-drafts or under-drafts with varying amounts of foods being broiled covering over varying amounts of the alternate openings.

---

This invention relates to improvements in broilers employed in the broiling of steaks, chops, hamburgers and the like. This invention is particularly concerned with the grid or meat supporting portion of the broiler and the elimination of excessive flare-up and excessive smoking difficulties prevailing with char type or radiant broilers.

With char or radiant type broilers comprising a fire box structure with grid for holding the food to be broiled supported above the fire box, savory broiled foods are quickly and easily produced. The dripping of the liquefied fat from the food being broiled down onto the radiant ceramic briquettes or charcoal or refractory radiants produces smoke that flavors the foods being broiled and the intense radiant heat chars or sears the outside of the foods being cooked in a manner that retains the inner juices. Foods thus cooked have a superior flavor and as a good portion of the fat of the food being broiled drips off in the form of fluid due to the intense radiant heat foods so cooked are more healthful and appealing, particularly to those who are calorie conscious or those who have difficulty in digesting fatty foods.

The popularity of this char or radiant type broiler has been growing by leaps and bounds due to the superior flavor and advantages of foods so cooked. Broilers employing this principle have serious disadvantages particularly with regard to controlling the flow of liquefied fat into the fire box for a certain amount of flow of liquefied fats into the fire box and on to the ceramic briquettes or charcoal or radiant ceramics is necessary to produce the smoky flavor and the showmanship associated with a little flame flare-up around the food being broiled on the grid, however this flare-up particularly with foods with more fat such as corn fed beef steaks, pork chops and sausage and the like so much goes down into the fire box that the flame and flare-up ignites the foods being broiled on the grid with the result that they become charred and burned and also a very definite and positive fire hazard results therefrom. As a matter of fact, the advent of char type broiling in commercial eating establishments has greatly increased the incidence of fires in such establishments in the past few years. The reason for this is that such char or radiant type broilers have an intense heat within the fire box and with such intense heat it does not take too much liquefied fat to flare up very high and reach grease laden filters or exhaust canopies and start a fire. The flare-up caused by liquefied fat draining into the fire box of contemporary char or radiant broilers has brought about a number of definite and complicated devices in an attempt to alleviate this. One char type broiler, in an effort to solve this trouble, has resorted to a complicated system of baffles and shutters to vary the flow of air to the fire box. Of course, by controlling and shutting down the air to the fire box chamber one can reduce the fire within same which would cut down on a flame type flare-up but this would also reduce temperature of the radiant material and slow down the broiling operation. The same effect results when the flow of gas to the burners in the gas heated ceramic briquette type broiler is reduced. Another broiler employs a blower or fan type of air induction in the fire box and in attempting to control the flame flare-up the flow of air from the blower is cut down. Here again, this cuts down the fire box temperature and slows down the broiling process. Another broiler has a raising and lowering device that tilts the broiling grid at an increasing angle to move the food being broiled further away from the fire box and also through the increasing tilt of the grid section that liquefied fat which clings to the grid bars is directed to a removable collecting vessel. Of course, this tilting arrangement helps to some degree but only a small portion of the grease from food being broiled is collected even with the grid at an acute angle as a majority of the liquefied fat will drop in between the grid bars into the fire box or will liquefy on the grid bars and drop off or become inflamed by the intense heat before reaching the fat collecting vessel. Also, the tilting mechanism complicates the broiling grid, makes it cumbersome and difficult for removing and cleaning and due to the intense heat from the fire box it is difficult to keep the tilting mechanism in order. Also, of course, the removal of the foods being broiled by raising the tilting mechanism to an acute angle may cut down on the flare-up and the actual flaming or burning of the foods it also slows down the broiling process as the foods are removed further away from the radiant and convected heat.

In addition to the flame flare-up difficulties with contemporary char or radiant type broilers, another serious drawback is that they do not cook uniformly at various degrees of loading or coverage on the broiling grid. Contemporary broilers of this type depend upon the escape of the exhaust heat from the fire box up through the openings within the food supporting broiling grids. Obviously, there is plenty of exhaust opening when only a small portion of the broiling grid is covered with food being cooked but when the broiling grid becomes half covered with food being cooked but when the broiling grid becomes half covered the flame begins to stifle down as the flow of exhaust heat is confined to a smaller area and as the grid approaches being fully covered the fire box radiant heat is seriously choked down to the extent that smoking results and when the grid is completely covered during peak loading the resultant stifling and smoking with contemporary broilers is intolerable and the person doing the broiling has to remove some of the food to permit the flow of exhaust heat to escape and prevent the complete choking and stifling of the fire box. Obviously, the entire grid areas of such contemporary broilers cannot be utilized. Also, it is obvious that the cooking time of a given size steak will vary greatly dependent upon the amount of foods being cooked at the same time upon the broiling grids.

My invention overcomes these two very serious disadvantages with contemporary char or radiant type broilers by means of a novel type of reversible grease flow broiling grid which directs the flow of approximately two-thirds of the liquefied fat from the food being broiled directly into a collecting well so that only one-third of the liquefied fat from the food being broiled is directed into the fire box which is sufficient to produce the smoke and a little flare-up for savory flavor, aroma and appearance of the broiled food. As the broiler grids with my invention are sectional and easily hand removed they are so designed as to be reversible so that when lean foods with little fat are being broiled the broiler grid can be turned over and its novel construction then permits all of the liquefied fat from the food then being broiled to drop into the fire box to produce the required smoke and small flare-up for optimum broiling with lean foods such as ground meat patties, chicken and fish. In addition to the novel invention of the reversible grease flow broiling grid, my invention provides an enclosed rear exhaust flueway from the fire box chamber in order that uniform broiling is accomplished regardless of the degree of coverage of the broiling grid area and further eliminating any smoking or stifling down of the fire box when the broiling grids are completely covered with foods being broiled as ample draft for continuous flow of heat is provided by the full length upward extending flueway. It is obvious that this enclosed rear exhaust flueway out of the fire box chamber allows the entire broiling grid surface to be utilized. Also, the enclosed exhaust flueway provides uniform broiling times for uniform sized foods.

All of the aforementioned facts and objects of the invention as well as the details of a typical and illustrated embodiment will be understood fully from the following description of the accompanying drawings.

In the drawings:

FIGURE 1 is a side elevation cutaway view taken along the line 1—1 of FIGURE 2.

FIGURE 2 is a front elevational view of FIGURE 1 with a portion of the front of the casing being broken away to illustrate more clearly the reversible broiler grid sections.

FIGURE 3 is a fragmentary perspective view of the grid end section with the U channels inverted to direct all liquefied fat into the fire box as with lean meat patties.

FIGURE 4 is a fragmentary perspective view of the grid end section with the U channels upward to direct the majority of liquefied fat into the collecting well as with corn fattened beef steaks.

Referring to the drawings in detail:

FIGURE 1 is a side elevation cutaway view taken on line 1—1 of FIGURE 2 and looking in the direction of the arrows, the outer casing 1 is provided with an upwardly extending rear housing 2 containing vertical exhaust flue 3. Grid sections 4 are supported at the rear by backsplash portion 7 having a forward extending flange at its lower end with said flange having vertical pins 5 extending into the inner openings of the grids 4 to hold the grid sections in the inclined position shown with their other end supported by inward extending flange 8 of collecting well 9. In the preferred form, heat from the gas burners 20 brings the refractory bodies or ceramic coals 15 supported by grate section 16 to an intense red heat so that foods supported on grid 4 are broiled by intense searing radiant heat and convection.

With grid sections having their U channels upward as shown by the right grid section in FIGURE 2 the majority of the liquid fat from the foods being broiled drops into the U channels 4A and flows into the front collecting well 9. The right hand grid section with U channels upward is used in broiling foods with a high fat content such as corn fed beef steaks, pork sausage and chops, etc. The grids 4 are provided with openings into the fire box between the U channels so that a minor portion of the liquefied fat drops onto the red hot refractory bodies 15 to provide some smoke and some little flame flare-up for a savory smoke flavor and aroma of char type radiant broiling.

With the grid sections having their U channels inverted as shown by the left grid section in FIGURE 2 all of the liquefied fat from the foods being broiled drops into the openings between the inverted channels on to the red hot refractory bodies 15. The grid sections with U channels so inverted would be used in broiling lean meat such as ground steak patties, chicken or fish as it is desirable to have all of the liquefied fat from such lean foods drop on to the coals to provide the savory smoke, flavor and aroma.

Referring to FIGURE 2, the liquefied fats collected in the well 9 are directed to the outlet 10 and are carried down through vertical pipe 11 into a grease collecting pan 13 which is supported to the casing leg by slide support member 14. Flange 17 supports grate 16 which in turn holds refractory bodies 15. Pipe 18 carries gas through valve 19 to burners 20 which provide the heat to bring refractory bodies 15 to the intense red temperature required for char type radiant broiling.

FIGURE 3 is a fragmentary perspective view of the grid end section with the channels inverted more clearly shows the position of the left grid section in FIGURE 2. Supporting ribs 4B on the top portion of the inverted U channels support foods being broiled and all liquefied fat is directed into the fire box through the alternate openings.

FIGURE 4 is a fragmentary perspective view of the grid section with the U channels upward to more clearly illustrate the position of the right grid section in FIGURE 2. It will be noted that the grid sections 4 are provided with channels 4A to collect the majority of the liquefied fat when the grid is positioned as shown in FIGURE 4.

Vertical exhaust flue 3 is provided at its lower end with an opening into the fire box area at the rear below the grid sections so that the entire area of the grid sections may be covered with foods to be broiled without stifling the burner flame or causing a choking down and smoking condition that would result without ample draft and egress for exhaust heat.

It is obvious to one skilled in the art that gas burners could be eliminated by substituting charcoal in place of the refractory bodies 15 and igniting the charcoal or oil or electric heaters could be used to heat the refractory bodies rather than the gas burners.

While I have described the preferred embodiments of my invention and illustrated same in the accompanying drawings, certain minor changes or alterations may appear to one skilled in the art to which this invention relates during the extensive manufacture of same and I therefore reserve the right to make such alterations or changes as shall fairly fall within the scope of the appended claims.

I claim:

1. A broiler comprising a casing means, fire box means within said casing, sectional reversible cooking grid means supported above said fire box, said grid provided with multiple U shaped parallel channels with openings into said fire box between said channels, said channels being fixedly inclined toward a fat collecting well deposed below the edges of said channels; with said sectional grid reversed or turned over said U shaped channels are inverted exposing a supporting rib on the top portion of each inverted U channel with alternate openings between said channels and opening into said fire box.

2. A broiler comprising a casing containing a fire box structure, a sectional reversible cooking grid means supported above said fire box, said grid provided with multiple U shaped parallel channels with alternate openings between said channels, said U shaped channels comprising the larger portion of said grid area with said alternate openings comprising the smaller portion of said grid area, said U shaped channels fixedly inclined toward a fat collecting well deposed below the lower edges of said channels thereby receiving the majority of the liquefied fat from the foods heating on said grid, the lesser portion of said liquefied fat dropping into said fire box through said alternate openings; with said grid reversed or turned over said U shaped channels are inverted thereby directing all of the liquefied fat from the foods being broiled to drop into the fire box through said alternate openings.

3. A broiler as in claim 1 with said reversible cooking grids completely covering the fire box with an opening below said grids at the rear of said fire box into a vertical rear exhaust flue, said flue providing outlet egress for exhaust heat from said fire box with said grids completely covered with foods being broiled.

4. A broiler as in claim 2 with said reversible cooking grids completely covering the fire box with an opening below said grids at the rear of said fire box into a vertical rear exhaust flue providing outlet egress for exhaust heat from said fire box with said grids completely covered with foods being broiled.

5. A broiler as in claim 1 with cooking grid sections having multiple V shaped parallel channels with alternate openings.

6. A broiler as in claim 2 with cooking grids having multiple V shaped parallel channels with alternate openings.

7. A broiler comprising an upstanding casing structure including three closed side walls, a fourth side wall with an opening along its upper portion into a like width vertical exhaust flue, gas burner means with overlying refractory coals contained within a lower portion of said casing and at an upper elevation grid support means at two levels having overlying, reversible food supporting grid sections with multiple U shaped parallel channels inclined toward a fat collecting well deposed below the lower edges of said U channel sections with alternate openings between said channels for passage, of a limited portion of the liquefied fats from foods being broiled, onto said refractory coals with the balance of the liquefied fats carried by said U channels to said fat collecting well; with said grid section or sections reversed or turned over a flat food supporting rib on the top of each inverted U channel is exposed with said alternate openings between said channels for passage of all the liquefied fats from foods being so broiled onto said refractory coals.

References Cited
UNITED STATES PATENTS

| | | | |
|---|---|---|---|
| 806,475 | 12/1905 | Koneman | 99—446 |
| 1,422,835 | 7/1922 | Condy | 99—445 |
| 1,504,102 | 8/1924 | Davis | 99—447 X |
| 1,627,742 | 5/1927 | Jones | 99—445 |
| 2,790,742 | 4/1957 | Del Francia. | |
| 3,199,438 | 8/1965 | Myler et al. | 99—446 X |

WALTER A. SCHEEL, *Primary Examiner.*

S. P. FISHER, *Assistant Examiner.*